United States Patent [19]
Voss et al.

[11] Patent Number: 5,758,739
[45] Date of Patent: Jun. 2, 1998

[54] HYDRAULIC STEERING CIRCUIT AND STEERING APPARATUS

[75] Inventors: Gerhard Voss, Parchim; Erhard Bergmann, Mirow, both of Germany

[73] Assignee: Hydraulik Nord GmbH, Parchim, Germany

[21] Appl. No.: 649,655

[22] PCT Filed: Nov. 8, 1994

[86] PCT No.: PCT/DE94/01335

§ 371 Date: May 13, 1996

§ 102(e) Date: May 13, 1996

[87] PCT Pub. No.: WO95/13951

PCT Pub. Date: May 26, 1995

[30] Foreign Application Priority Data

Nov. 13, 1993 [DE] Germany .......................... 43 38 847.7

[51] Int. Cl.[6] .......................................................... B62D 5/08
[52] U.S. Cl. ........................................... 180/403; 180/442
[58] Field of Search ................................... 180/402, 403, 180/417, 418, 421, 442

[56] References Cited

U.S. PATENT DOCUMENTS

| 4,553,390 | 11/1985 | Liebert et al. ............... 180/403 X |
| 5,056,311 | 10/1991 | Tischer ........................ 180/403 X |

FOREIGN PATENT DOCUMENTS

| 137 185 | 8/1984 | European Pat. Off. . |
| 28 10 902 | 9/1979 | Germany . |
| 3126226 | 1/1983 | Germany . |
| 3507901 | 3/1988 | Germany . |
| 62-149559 | 7/1987 | Japan . |
| 91/12985 | 9/1991 | WIPO . |

*Primary Examiner*—Kevin Hurley
*Attorney, Agent, or Firm*—Horst M. Kasper

[57] ABSTRACT

A hydraulic steering apparatus comprises a throttle (10) with a bypass line, eliminating the function of the throttle (10) in the direction of the steering cylinder (2). The throttle (10) is disposed between the control valve (3) of the steering apparatus (1) and the cylinder volume of the steering cylinder (2) on the piston rod side. The throttle (10) is used in connection with hydraulic steering apparatus for slow-moving vehicles.

4 Claims, 3 Drawing Sheets

HYDRAULIC STEERING CIRCUIT AND STEERING APPARATUS

BACKGROUND OF THE INVENTION

1. Field of the Invention

The invention relates to a hydraulic steering circuit for slow-moving vehicles and to a hydraulic steering apparatus therefor, which includes a control valve and a metering pump, wherein the control valve includes an interior control piston, controllable by the steering wheel, and an outer control sleeve connected mechanically to the metering pump, wherein both are disposed concentrically relative to each other, and wherein both are rotatable to a limited degree relative to each other against the force of a spring, and wherein the control piston and the control sleeve have grooves cooperating with each other for connecting the metering pump to connectors of a steering cylinder.

2. Brief Description of the Background of the Invention Including Prior Art

Steering circuits of this kind are sufficiently known. They comprise essentially a tank, a supply pump, a hydraulic steering apparatus, and a hydraulic steering cylinder. The steering apparatus has, on the one hand, a feed connector and a discharge connector, which are both connected to the tank, and, on the other hand, two cylinder connectors, which are in connection with the two cylinder volumes of the steering cylinder. The steering cylinder, in general, is furnished with a one-sided piston rod, wherein the piston rod transfers its motion mechanically through a steering linkage to the guiding wheels.

Based on the one-sided piston rod, the two cylinder volumes have naturally different volumes. Upon actuation of the steering apparatus in one rotation direction, metered oil is transported through the steering apparatus in one of the two cylinder volumes and at the same time the oil is displaced from the other cylinder volume and fed thereby again to the tank through the steering apparatus. For this purpose, the same grooves in the control piston are available in the steering apparatus for the two directions of rotation.

The function of such a steering circuit with a corresponding steering apparatus is always satisfactory in cases where, corresponding to the circumstances, a sufficient steering load has to be overcome.

However, in certain individual application cases and application locations, pulling forces can occur at the piston of the steering cylinder, as is the case, for example, upon fast travel and a high rotation speed of the steered wheel of articulated frame steered vehicles. This pulling load at the cylinder piston can lead to the elimination of the steering load, based on the small oil volume, on the piston rod side when steering against the floor of the cylinder piston. Thereby, the steering cylinder runs in advance of the steering motion. An uncontrolled steering behavior is the consequence and is associated with all its danger.

A circuit with such a steering apparatus is described in the Printed Patent document WO-A-9112985, wherein a one-way restrictor is furnished in the working line between the control valve and the working area of the steering cylinder on the piston rod side for decreasing the influence of a negative damping relative to the dynamics of vehicle movement. The check valve is thereby blocked in the direction from the steering cylinder to the control valve.

This circuit increases the equipment-technological expenditures substantially.

A corresponding steering apparatus is presented in the printed patent document DE-A-2810902, wherein longitudinal control grooves are furnished in the control piston subdivided in two parts relative to their length for the purpose of decreasing the interior leak flows.

This solution does not eliminate the uncontrolled behavior of the steering cylinder in case of a pulling load.

SUMMARY OF THE INVENTION

1. Purposes of the Invention

It is an object of the present invention to create a hydraulic steering circuit and a corresponding steering apparatus which assures a sufficient steering load in the two steering directions in case of a steering cylinder with a one-sided and pullingly loaded or tension-loaded piston rod.

These and other objects and advantages of the present invention will become evident from the description which follows.

2. Brief Description of the Invention

The present invention provides for a hydraulic steering circuit and steering apparatus, wherein a throttle is disposed in the line between the control valve of the steering apparatus and the cylinder volume of the steering cylinder on the piston rod side. The throttle includes a bypass line which eliminates the function of the throttle in the direction of the steering cylinder.

The hydraulic steering apparatus comprises a control valve and a metering pump. The control valve is furnished with an interior control piston, controllable by a steering wheel, and an outer control sleeve mechanically connected to the metering pump. The control piston and the control sleeve are disposed concentrically relative to each other and are rotatable relative to each other to a limited degree against a force of a spring and are furnished with feed grooves and discharge grooves cooperating with each other. The feed grooves, connected to the metering pump, and the discharge grooves of the control piston, connected to a steering cylinder, are furnished as axial grooves which are uniformly distributed over their circumference. The discharge grooves of the control piston are formed with openings toward the interior of the control valve. The discharge grooves furnished in the control piston are formed as a first discharge groove and a second discharge groove. The first discharge groove and the second discharge groove are aligned axially relative to each other. The first discharge groove is coordinated to a cylinder volume on a piston side. The second discharge groove is coordinated to a cylinder volume of the steering cylinder on a piston rod side. The opening of the discharge groove, disposed on the piston rod side, is furnished as a throttle.

Each of the discharge grooves can be delimited in two axial directions and the opening of the discharge groove and/or the throttle of the discharge groove can be furnished as radial boreholes relative to a rotation axis of the control piston.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
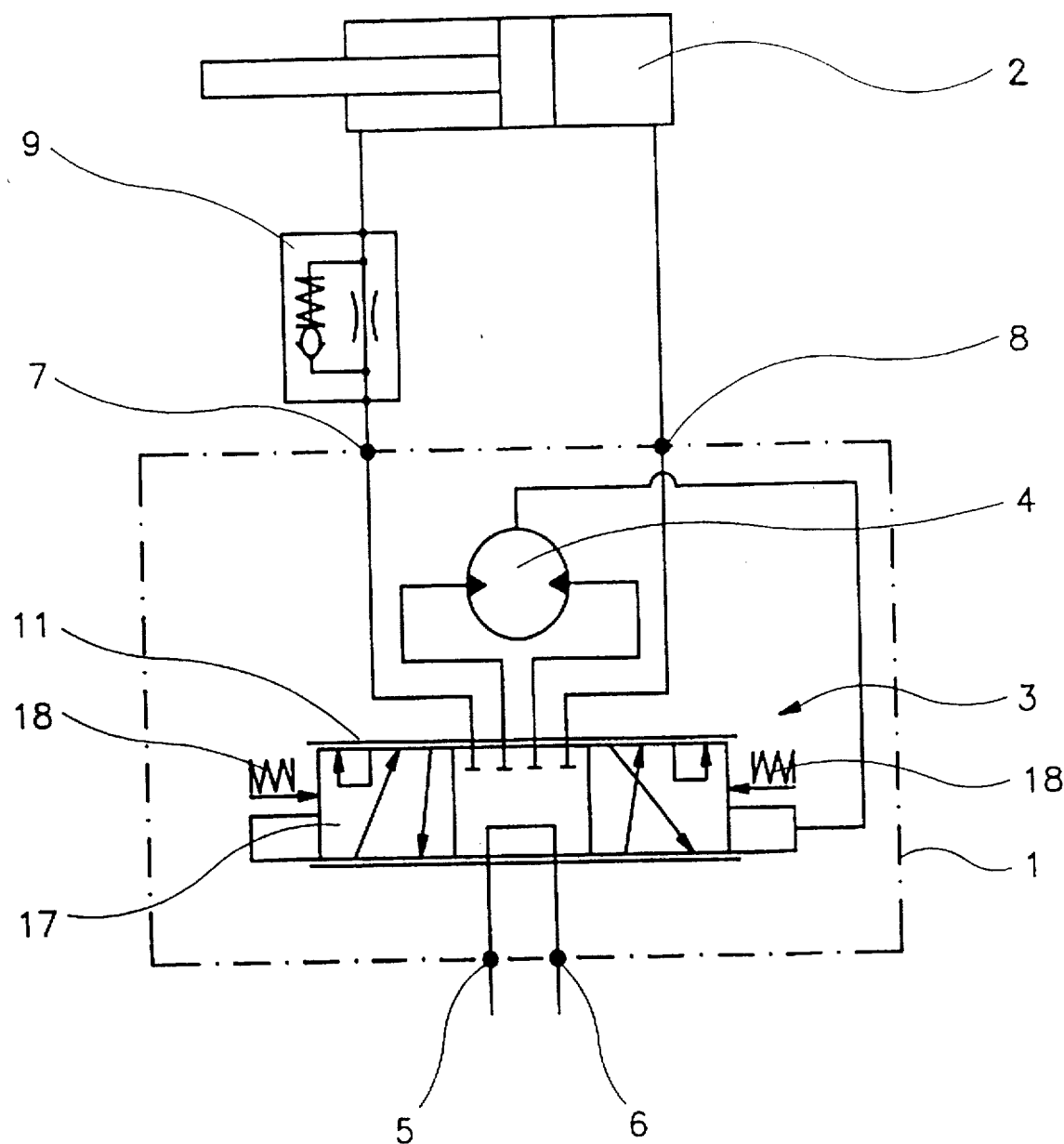
FIG. 1 is a view of a schematic diagram of a circuit with a first variation of a solution.
Figure 2:
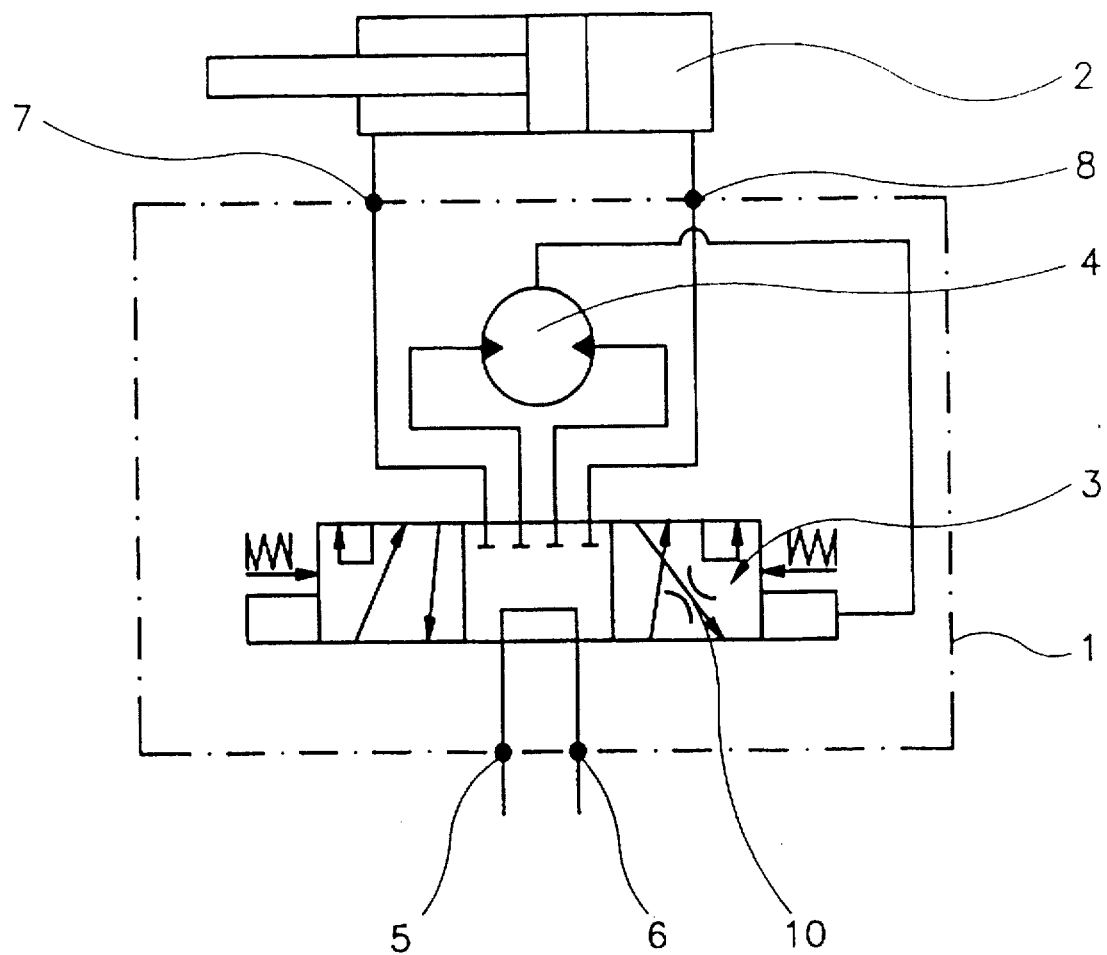
FIG. 2 is a view of a schematic diagram of a circuit with a second variation of a solution.

As the FIGS. 1 and 2 show, the steering circuit includes essentially a steering apparatus 1 and a steering cylinder 2. The steering apparatus 1 is composed of a control valve 3 and a metering pump 4 and includes, on the one hand, a feed connector 5 and a discharge connector 6 and, on the other hand, a cylinder connector 7 for the, for example, left rotation, and a cylinder connector 8 for the then remaining right rotation. The cylinder connector 7 is connected to the piston rod side and the cylinder connector 8 is connected to the piston side of the steering cylinder 2. According to FIG. 1, a one-way restrictor 9 is disposed according to the invention in the line between the control valve 3 of the steering apparatus 1 and the piston rod side of the steering cylinder 2 in such a way that the one-way restrictor 9 opens in the direction toward the steering cylinder 2.

A throttle 10 is disposed in the control valve 3 of the steering apparatus 1 in a groove constructed only for the return flow instead of the one-way restrictor 9.

Figure 3:
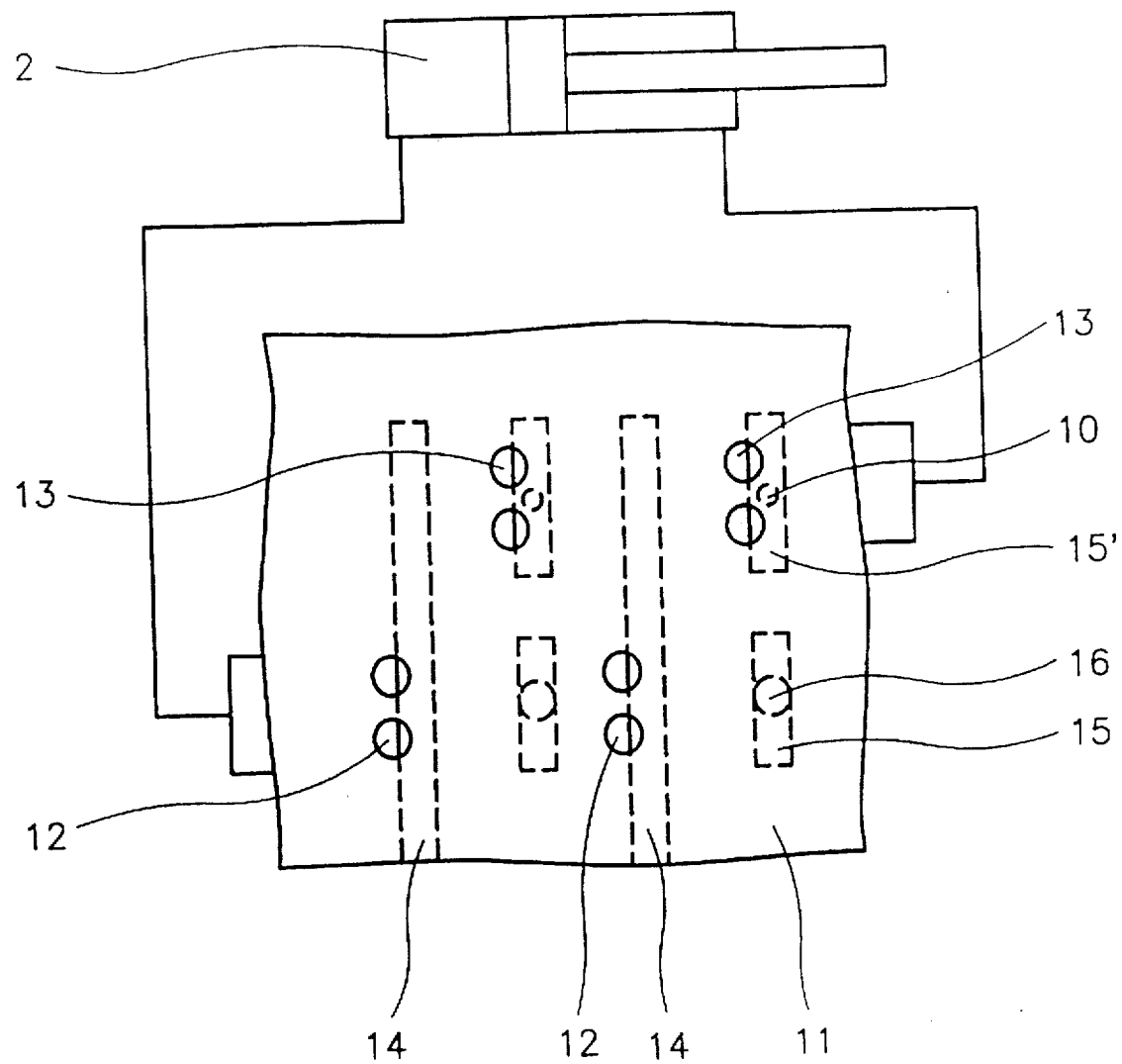
FIG. 3 is a view of a schematic diagram of a control valve of a steering apparatus.

For this purpose, the control valve 3 of the steering apparatus 1 is constructed according to FIG. 3. The control valve 3, operating according to the rotary slide principle, includes an internal control piston 17, controllable by the steering wheel, and an external control sleeve 11, mechanically connected to the metering pump 4. The control piston 17 and the control sleeve 11 are rotatable relative to each other to a limited degree against the force of a spring 18.

The control sleeve 11 is furnished with a row of boreholes 12 uniformly distributed at the circumference, and a second row of boreholes 13, uniformly distributed at the circumference, however, directed radially staggered in tangential direction with respect to the boreholes 12. The row of the boreholes 12 and the row of the boreholes 13 can be provided as single rows or multiple rows. The control piston 17 exhibits at its surface several axial feed grooves 14, distributed uniformly at the circumference. Axial discharge grooves 15 and 15' are disposed in the control piston 17 also uniformly and with the same subdivision, but staggered by a half subdivision. All discharge grooves 15 and 15' are in each case axially delimited toward two sides. Thereby each discharge groove 15 is also separated from the associated discharge groove 15'. The discharge grooves 15 are in each case connected by an opening 16, and the discharge grooves 15' by the throttle 10, to the interior of the control valve 3 and thus to the discharge connector 6 of the steering apparatus 1. The cross-section of the opening 16 is selected to be relatively large and is matched to the cylinder volume of the steering cylinder 2 on the piston side. The cross-section of the throttle is provided relatively small and is directed toward the cylinder volume of the steering cylinder 2 on the piston rod side.

The mode of operation of the hydraulic steering apparatus for mobile plants is generally known.

The oil furnished by a pump is returned again without effect to the tank in a neutral position and based on a corresponding constructive layout of the steering apparatus 1.

Upon actuation of the steering wheel in one direction, the control piston 17 and the control sleeve 11 are rotated relative to each other, and thus the feed connections are released by the metering pump 4 to one side of the steering cylinder 2. At the same time, the discharge connections in the control valve 3 of the steering apparatus 1 open up.

The oil present at the feed connector 5 flows thereby through the control valve 3 and the metering pump 4 and exits at the cylinder connector 7 from the steering apparatus 1. According to FIG. 1, the check valve of the non-return valve with restriction or one-way restrictor 9 opens and releases a throttle-free cross-section. Based on the adjusting pressure on the piston rod side, the piston rod of the steering cylinder 2 shifts and actuates the wheels to be steered. The oil is displaced thereby from the cylinder volume on the piston side and passes in a conventional fashion through the metering pump 4 and the control valve 3 to the tank. In case of a change in the direction of rotation at the steering wheel, the flow direction of the oil reverses. Now, the oil present in the cylinder volume of the steering cylinder 2 on the piston rod side is displaced and passes the one-way restrictor 9 only through the throttle opening. In case a normal steering behavior, for example, on a road section with no slope, only small pressure losses occur at the one-way restrictor 9, and thus only a negligible steering load occurs. In the case that a pulling load occurs at the piston rod of the steering cylinder 2, for example, on a road section with downhill slope and with a high steering speed at the guided wheel of an articulated frame steered vehicle, then the pressure loss increases at the one-way restrictor 9. The banked pressure in front of the one-way restrictor 9 opposes the direction of motion of the piston rod with a force, corresponding approximately to the pulling load. The steering behavior remains normal.

In the constructive embodiment of the steering apparatus 1 according to FIGS. 2 and 3, an identical functional behavior is obtained in case of a changed course of the flow of oil. A separate line with different cross-sections is associated to each cylinder volume of the steering cylinder 2 in the return line inside of the control valve 3. In case of the displacement of the flow of oil from the cylinder volume on the piston side, the oil passes through the metering pump 4 to the boreholes 12 of the control sleeve 11 and from there through the discharge grooves 15 and the radial opening 16 to the tank.

In case of the displacement of the oil flow from the cylinder volume of the steering cylinder 2 of the piston rod side, the path of the oil again runs through the metering pump 4 to the boreholes 13 of the control sleeve 11 and from there through the discharge grooves 15' and the throttle 10 to the tank.

It will be understood that each of the elements described above, or two or more together, may also find a useful application in other types of steering apparatuses differing from the types described above.

While the invention has been illustrated and described as embodied in the context of a hydraulic steering circuit and steering apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Hydraulic steering apparatus comprising a control valve and a metering pump, wherein the control valve includes an interior control piston, controllable by the steering wheel, and an outer control sleeve, mechanically connected to the metering pump, wherein the control piston and the control sleeve are disposed concentrically relative to each other and are rotatable relative to each other to a limited degree against the force of a spring and are furnished with feed and discharge grooves cooperating with each other, wherein the feed grooves and the discharge grooves of the control piston are furnished as axial grooves with openings toward the interior of the control valve, wherein the axial grooves are distributed uniformly at the circumference, characterized in that the discharge grooves (15, 15') are furnished in the control piston (17) subdivided in two parts in axial direction, that the discharge groove (15) is coordinated to the cylinder volume on the piston side and that the discharge groove (15') is coordinated to the cylinder volume of the steering cylinder (2) on the piston rod side, and that the opening of the discharge groove (15') is furnished as a throttle (10).

2. Hydraulic steering apparatus according to claim 1, characterized in that each of the discharge grooves (15, 15') is limited in the two axial directions and that the opening (16) of the discharge groove (15) and the throttle (10) of the discharge groove (15') are furnished as radial boreholes.

3. Hydraulic steering apparatus comprising a control valve and a metering pump, wherein the control valve is furnished with an interior control piston, controllable by a steering wheel, and an outer control sleeve mechanically connected to the metering pump, wherein the control piston and the control sleeve are disposed concentrically relative to each other and are rotatable relative to each other to a limited degree against a force of a spring and are furnished with feed grooves and discharge grooves cooperating with each other, wherein the feed grooves, connected to the metering pump, and the discharge grooves of the control piston, connected to a steering cylinder, are furnished as axial grooves which are uniformly distributed over their circumference, and wherein the discharge grooves of the control piston are formed with openings toward the interior of the control valve, wherein the discharge grooves furnished in the control piston (17) are formed as a first discharge groove (15) and a second discharge groove (15'), wherein the first discharge groove (15 and the second discharge groove (15') are aligned axially relative to each other, and wherein the first discharge groove (15) is coordinated to a cylinder volume on a piston side, and wherein the second discharge groove (15') is coordinated to a cylinder volume of the steering cylinder (2) on a piston rod side, and wherein the opening of the discharge groove (15'), disposed on the piston rod side, is furnished as a throttle (10).

4. The hydraulic steering apparatus according to claim 3, wherein each of the discharge grooves (15, 15') is delimited in two axial directions and that the opening (16) of the discharge groove (15) and the throttle (10) of the discharge groove (15') are furnished as radial boreholes relative to a rotation axis of the control piston (17).

* * * * *